(12) United States Patent  (10) Patent No.: US 7,677,519 B2
Gauer  (45) Date of Patent: Mar. 16, 2010

(54) COMPUTER WORKSTATION

(76) Inventor: Jeffrey S. Gauer, 11525 Olde Tiverton Cir., Reston, VA (US) 20194

( * ) Notice: Subject to any disclaimer, the term of this patent is extended or adjusted under 35 U.S.C. 154(b) by 10 days.

(21) Appl. No.: 12/219,376

(22) Filed: Jul. 21, 2008

(65) Prior Publication Data

US 2008/0283710 A1    Nov. 20, 2008

Related U.S. Application Data

(63) Continuation-in-part of application No. 11/595,751, filed on Nov. 13, 2006, now abandoned.

(51) Int. Cl.
| E04G 3/00 | (2006.01) |
| A47F 5/12 | (2006.01) |
| A45D 19/04 | (2006.01) |
| A47J 47/16 | (2006.01) |
| F16M 13/00 | (2006.01) |

(52) U.S. Cl. .................. 248/371; 248/917; 248/923; 248/397; 248/284.1

(58) Field of Classification Search .............. 248/371, 248/166, 129, 441.1, 676, 372.1, 393, 397, 248/122.1, 284.1, 125.1, 455, 188.5, 122, 248/252.1, 445, 917, 923; 108/179, 59, 1, 108/5, 6, 10, 50.01, 138; 5/512, 11, 611, 5/507.1; 312/223.2, 223.3

See application file for complete search history.

(56) References Cited

U.S. PATENT DOCUMENTS

| 3,790,770 | A | | 2/1974 | Stern |
| 4,410,158 | A | | 10/1983 | Maffei |
| 4,848,710 | A | | 7/1989 | Newman |
| 5,630,566 | A | * | 5/1997 | Case ..................... 248/122.1 |
| 5,671,091 | A | | 9/1997 | Monroe et al. |
| 5,737,107 | A | * | 4/1998 | Umeda ..................... 398/106 |
| 5,859,762 | A | | 1/1999 | Clark et al. |
| 6,113,050 | A | | 9/2000 | Rush |
| 6,269,753 | B1 | | 8/2001 | Roddan |
| 6,374,752 | B1 | * | 4/2002 | Walser ..................... 108/50.01 |
| 6,394,402 | B2 | * | 5/2002 | Coonan et al. ......... 248/123.11 |
| 6,637,936 | B2 | | 10/2003 | Crain et al. |
| 6,796,536 | B1 | | 9/2004 | Sevier, IV |
| 6,842,332 | B1 | | 1/2005 | Rubenson et al. |
| 6,856,506 | B2 | | 2/2005 | Doherty et al. |
| 6,986,614 | B2 | * | 1/2006 | McLoone ................... 400/472 |

(Continued)

*Primary Examiner*—J. Allen Shriver, II
*Assistant Examiner*—Christopher Garft
(74) *Attorney, Agent, or Firm*—Dale J. Ream

(57) ABSTRACT

The computer workstation permits a user to work while reclining or in a supine position. The workstation has a monitor and a monitor platform for securely holding the monitor. The platform is independently adjustable and lockable in a selected horizontal and vertical position. The monitor moves with the platform so that the monitor is positioned in viewing position for the user when the user is in any position. The workstation also has a wireless transceiver for streaming signals between the monitor and a remote computer. The remote computer is wirelessly attached to the workstation. A keyboard/trackball platform is independently adjustable and lockable in selected positions. The keyboard/trackball platform has a wireless keyboard detachably mounted thereon. The keyboard assists the user to communicate with the remote computer. Additionally, there is a trackball for assisting the user to communicate with the remote computer. The trackball is detachably mounted on the keyboard/trackball platform.

6 Claims, 6 Drawing Sheets

U.S. PATENT DOCUMENTS

| | | |
|---|---|---|
| 7,063,294 B2 | 6/2006 | Miller |
| 7,082,882 B2 | 8/2006 | Heimbrock |
| 7,118,080 B2 | 10/2006 | Chan et al. |
| 7,121,518 B2 | 10/2006 | Hovde et al. |
| 2003/0100264 A1* | 5/2003 | Schroeder .................... 455/66 |
| 2005/0000020 A1 | 1/2005 | Schermel |

* cited by examiner

COMPUTER WORKSTATION

CROSS-REFERENCE TO RELATED APPLICATIONS

This is a continuation-in-part of my prior application Ser. No. 11/595,751, filed Nov. 13, 2006 now abandoned.

BACKGROUND OF THE INVENTION

1. Field of the Invention

The present invention relates to computer furniture and accessories, and particularly to a computer workstation that permits a user to work on a computer while reclining or in a supine position.

2. Description of the Related Art

With an increasing number of adults experiencing back pain that is exacerbated from working at traditional desk type computer stations, there is an increasing need for a workstation that would reduce or eliminate stress on neck and spine of the user.

Some of these back pain suffers have chronic pain caused by fibromyalgia. Fibromyalgia is a chronic pain syndrome that manifests in widespread muscle pain, especially in the back and legs. Chronic pain pervades the workforce. It is the number one cause of worker absenteeism and or inability to work at full capacity. Lower back pain ranks often first as a cause of disability and inability to work, as an interference with the quality of life, and as a reason for medical consultation. Research indicates that, for example, chronic pain limits an individual's ability and motivation to work. Financially, chronic pain represents health care costs of approximately twenty billion dollars per year, and industry costs in disability payments, lost productivity, and training of replacement personnel of about eighty billion annually. Because of the demands of lower back pain suffers, there has been attempts to manufacture and market computer workstations for use in an inclining position or fully supine position.

Elaborate computer workstations include a variety of storage shelves and spaces above and below a monitor, which are dimensioned to accept certain standard items of auxiliary equipment, including the computer or laptop too. While such workstations are often well designed and work well for a healthy, seated person, they are totally unsuited for people suffering from a variety of ailments, and in particular, the user with back pain, neck, and shoulder pain, and users required to spend some time lying prone. While lying prone or on one's back, a person cannot operate a personal computer supported on a conventional workstation, since the computer, monitor and the keyboard are at totally inappropriate angles. Additionally, the weight of these components makes using them in the prone or supine position nearly impossible. Thus, a computer workstation for use by the user in an inclined position or supine position solving the aforementioned problems is desired.

SUMMARY OF THE INVENTION

The computer workstation is for use by a user in a supine position or a reclining position, and includes a stand and a plurality of legs. The legs are connected to, and extend from, the stand. The legs support the stand, as do a pair of crossbar supports that are connected to the legs of the stand. The crossbar supports prevent the stand from bouncing or tipping over.

The workstation has a monitor and a monitor platform for securely holding the monitor. The platform is independently adjustable and lockable in a selected horizontal and vertical position. The monitor moves with the platform so that the monitor is positioned for viewing by the user while the user is reclining or in a supine position. The workstation also has a wireless transceiver for streaming signals between the monitor and a remote computer. The remote computer is wirelessly attached to the workstation.

A keyboard/trackball platform is also part of the workstation, and is independently adjustable and lockable in a selected vertical position. The keyboard/trackball platform is also independently adjustable and lockable around a horizontal axis. The keyboard/trackball platform has a wireless keyboard detachably mounted thereon. The keyboard assists the user to communicate with the remote computer. Additionally, there is a trackball for assisting the user to communicate with the remote computer. The trackball is detachably mounted on the keyboard/trackball platform.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
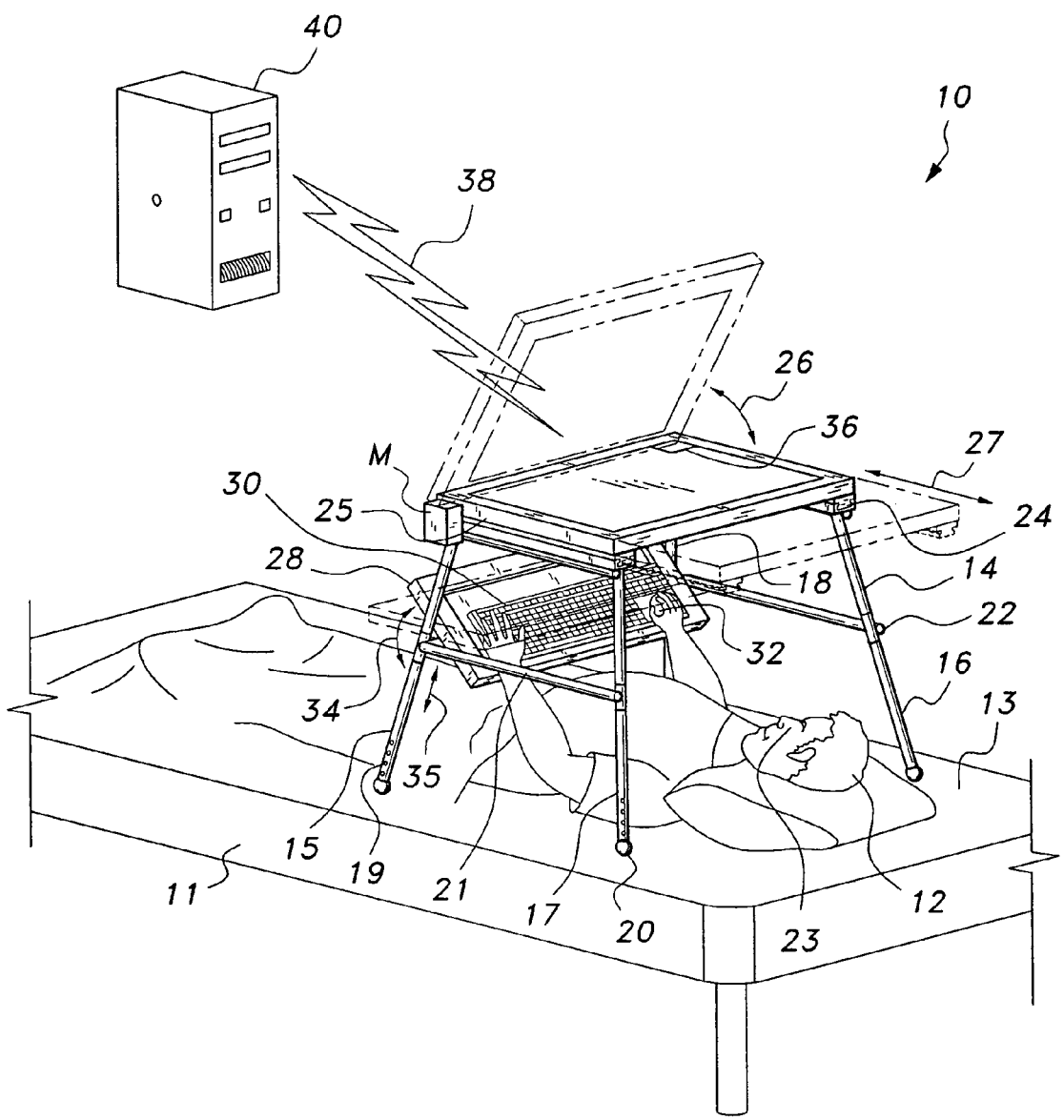
FIG. 1 is an environmental, perspective view of a computer workstation according to a first embodiment of the present invention with legs of the workstation positioned on a bed and a user in a supine position.

Referring to FIG. 1, a computer workstation, generally indicated by the numeral 10, is supported on a bed 11 above a user 12. The user 12 is in a supine position 13. The computer workstation 10 includes a stand 14. The stand 14 is constructed from powder-coated steel, colored plastic, and rubber. The stand 14 is sturdy enough to support the weight of workstation platforms and about twelve pounds of components. The height and width of the stand 14 are adjustable, while maintaining a safe solidity. The stand 14 has four legs 15, 16, 17, 18, and each leg has a spring-loaded locking height adjustment system, generally indicated with number 19, that includes a fail-safe lowest position lock. This spring-loaded locking height adjustment system 19 prevents the workstation 10 from falling below a specified height. In addition, each leg may include a locking caster, generally indicated with numeral 20, for rolling the stand 14 in and out of position, although the casters 20 may be omitted. Two crossbar supports 21, 22 prevent the stand 14 from bouncing or tipping over.

A monitor platform 24, after the stand 14, is the heaviest part of the workstation 10. The four legs 15, 16, 17, 18 support the monitor platform 24. The monitor platform 24 is independently adjustable and lockable. A monitor 25 is mounted to the platform 24. The monitor platform 24, with the monitor 25 mounted thereon, is pivotally mounted and is adjustable in an upward or vertical direction, as indicated by directional arrow 26, to move nearly perpendicular to the user 12.

In other words, the monitor platform 24 is adjustable to move the monitor 25 to match a typical reclining chair angle, such as partially reclined or fully reclined positions. The monitor platform 24 is also slidable and horizontally adjustable to a horizontal position 27 so that the monitor 25 can be positioned directly over the face 23 of the user 12 with the stand 14 remaining in place. A motor M is shown and can be attached to move the monitor platform in both the horizontal and vertical positions for those individuals who are not capable of making manual adjustments to the monitor platform 24.

It is uncomfortable for the arms of the user 12 to be in a raised position for a significant period of time, because blood flows downward and the fingers and arms get tired. Accordingly, a separate keyboard/trackball platform 28 is provided for a keyboard 30 and a trackball 32. The keyboard/trackball platform 28 is located closest to the user 12 and is adjustable independently of the monitor platform 24. The keyboard/trackball platform 28 can rotate about a horizontal axis, as indicated by directional arrow 34. The keyboard/trackball platform 28 can also be raised or lowered, as indicated by vertical directional arrows 35. The keyboard 30 and the trackball 32 are mounted on the keyboard/trackball platform 28, below the monitor platform 24. As with the monitor platform 24, the motor M is shown and can be attached to rotate the keyboard/trackball platform 28 around the horizontal axis and to raise or lower the keyboard/trackball platform, as indicated by the vertical directional arrows 35. Of course, the motor M would be for those individuals who are not capable of making manual adjustments to the keyboard/trackball platform 28.

Additionally, the keyboard 30 can be removed from the keyboard/trackball platform 28 so that the user 12 can place the keyboard 30 on the lap of the user 12, over their belly, or above their body, as desired. Like the monitor platform 24, the user 12 can easily adjust and lock the angle and distance of the keyboard/trackball platform 28. The keyboard/trackball platform 28 can be optionally configured for left-handed users of the workstation 10. Thus, a left-handed trackball would be mounted to the left side of the keyboard 30.

The stand 13 is able to support a weight of a nineteen-inch flat panel LCD monitor weighing about eleven pounds, unless a smaller size is appropriate. The stand 13 can further support a wireless keyboard weighing less than one pound, and trackball weighing less than one pound. Optional features for the stand 13 may be a storage bin and/or a beverage holder. These would be mounted on one of the vertical supports, such as legs 15, 16, 17, or 18 so that adjusting the monitor/keyboard platforms 24, 28 will not cause these items to spill.

The stand 14 also includes a wireless transceiver 36 for streaming signals 38 between the monitor 25 and a personal computer 40 in its vicinity. The transceiver 36 can be any of the following known wireless technology, such as BLUETOOTH, WIFI, OR ZIGBEE brands of wireless technology.

Figure 2:
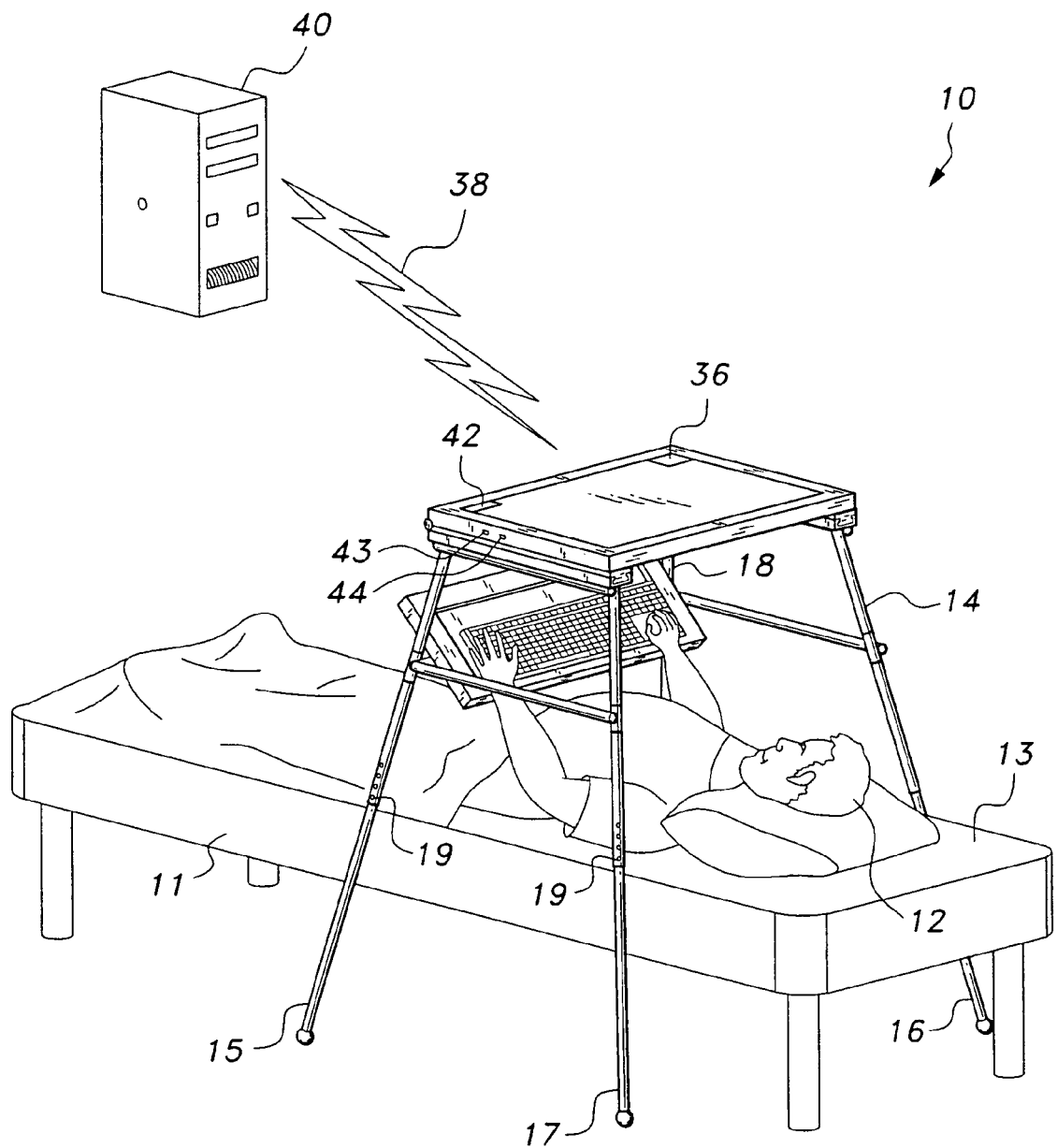
FIG. 2 is an environmental, perspective view of a computer workstation according to a second embodiment of the present invention with the legs of the workstation extended to the floor and the user in a supine position.

With reference to FIG. 2, an environmental, perspective view of the computer workstation 10 according to the second embodiment with the legs 15, 16, 17, 18 of the workstation 10 extended to the floor and the user 12 in the supine position 13 on the bed 11, is shown. In this embodiment, a minimum width of five feet is necessary for the stand 14 to extend to the floor. The locking members 19 on each of the legs 15, 16, 17, 18 are utilized to ensure the legs 15, 16, 17, 18 are locked once they are extended to the floor.

Because the workstation 10 is not a computer per se, the user 12 can use any existing laptop or desktop computer, as the remote computer 40, and the remote computer 40 does not need to be near the user 12 in the bed 11. Some sort of universal serial bus (USB) device attached to the remote computer 40 will communicate with the wireless workstation monitor 25, wireless keyboard 30, and wireless trackball 32.

One such device is the OTC 802.11G from OTC Wireless, a leading provider of 802.11 wireless solutions, that provides the enhanced wireless display solution, WiJET.G: the high-speed, 802.11g wireless display server for business and education users. The WiJET.G server can instantly transform any regular display device, be it a projector, LCD display, plasma flat panel or CRT monitor, such as monitor 25, into a wireless network ready node. The WiJET.G utilizes the IEEE 802.11g standard operating in the 2.4 GHz frequency range with data transfer rate of up to 54 Mbps. It is compatible with any 802.11g wireless communications computer using Windows 98 and above.

There are also additional wireless interfaces, generally indicated by numeral 42, so that the user 12 of the workstation 10 can connect speakers, a microphone, headset, or a webcam directly to the workstation 10. Of course, it is possible that all workstation 10 components, monitor 25, keyboard 30, trackball 32, and others such as web-cam, speakers, microphone or headphones can be integrated into one USB wireless interface, such as interface 42.

The workstation 10 also has at least two integrated connectors, including a video connector 43 and a power connector 44 for plugging the monitor video cord and the monitor power cord. The connectors 43, 44 may also comprise USB connection to transceiver adaptor modules, such as BLUETOOTH, WIFI, OR ZIGBEE brands of wireless technology. These transceiver adapter modules or connectors 43, 44 are used to connect input devices, such as USB mouse, USB keyboard, or USB display, wirelessly to the remote computer 40.

Figure 3:
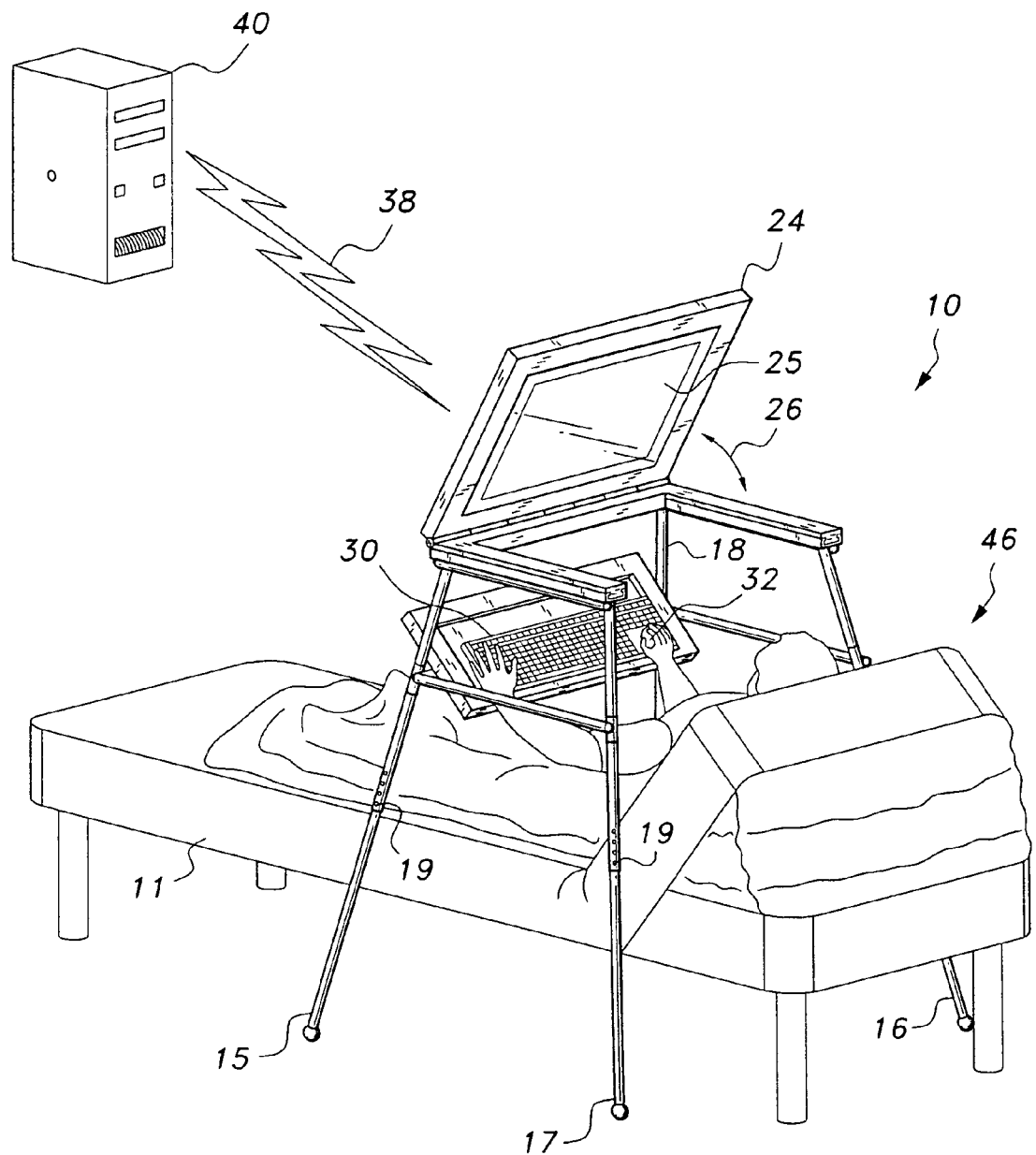
FIG. 3 is an environmental, perspective view of the computer workstation according to the second embodiment of the present invention with the user in a reclining position.

With reference to FIG. 3, the computer workstation 10 according to the second embodiment is shown with the user 12 in a reclining position 46. The locking members 19 on each of the legs 15, 16, 17, 18 are utilized to ensure the legs 15, 16, 17, 18 are locked once they are extended to the floor. The monitor platform 24 is moved to nearly the vertical position 26 putting the monitor 25 in a viewable position for the user 12. The keyboard/trackball platform 11 has been rotated and the user 12 in the bed 11 has moved to the inclined position 46.

The keyboard 30 can be any wireless keyboard. It might be a particularly ergonomic to use a keyboard like the Microsoft Wireless Laser Desktop 6000 or even the DataHand ergonomic keyboard.

The trackball 32, rather than having a mouse that relies on gravity to stay on a table, is an embedded trackball so that the user 12 can have the keyboard 30 and trackball 32 positioned directly above the user 12, facing downward. The trackball 32 might be the Kensington wireless trackball mouse. Of course, whichever trackball brand or model is chosen, the trackball 32 should be permanently affixed to the keyboard 30.

People with a mobility impairment use trackballs as an assistive technology input device. The control surface of a trackball is easier to manipulate and the buttons can be activated without affecting the pointer position. Some disabled users find trackballs easier since they only have to move their thumb relative to their hand, instead of moving the whole hand, while others incur unacceptable fatigue of the thumb. Elderly people sometimes have difficulty holding a mouse still while double-clicking; the trackball allows them to let go of the cursor while using the button.

Figure 4:
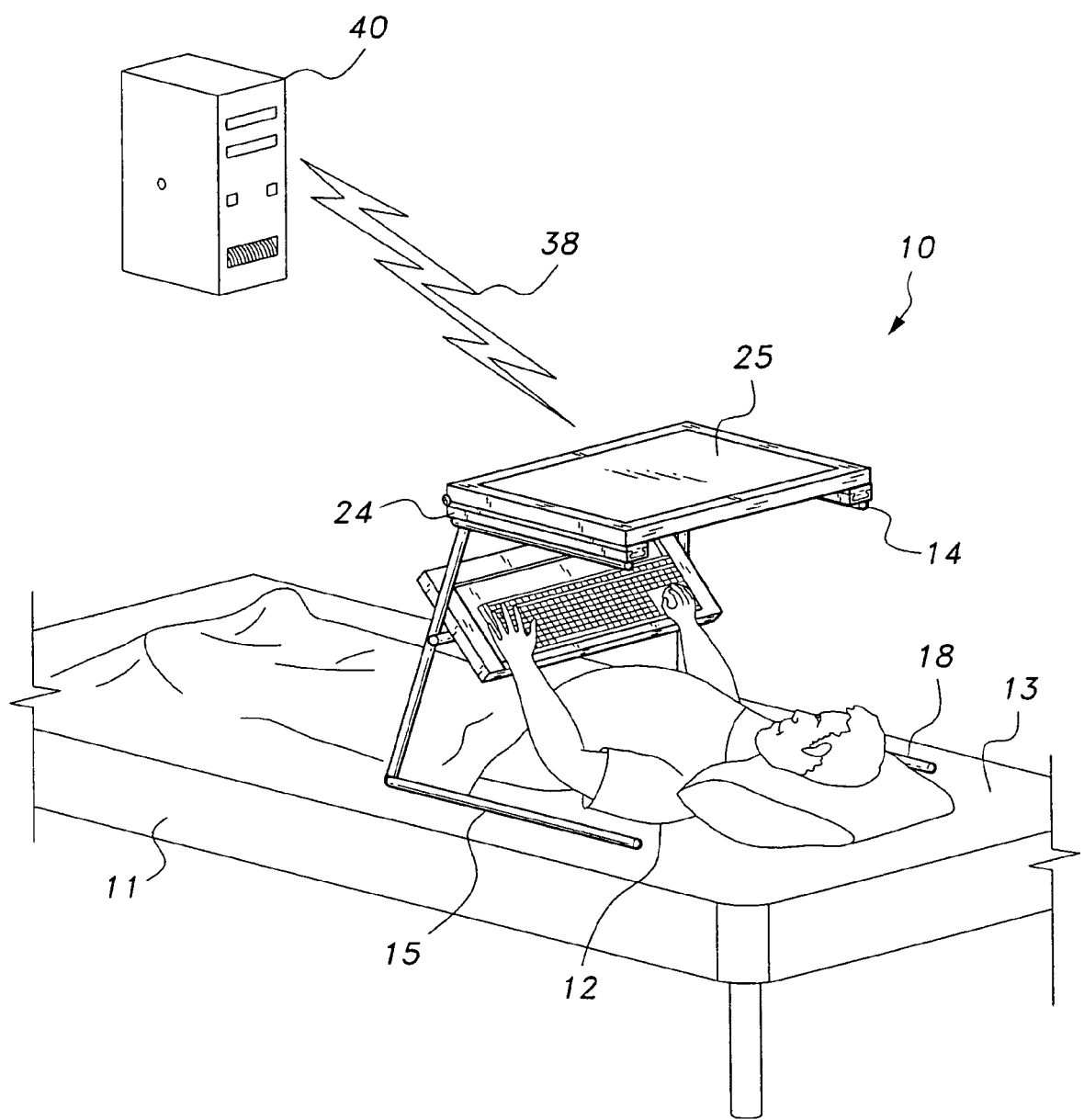
FIG. 4 is an environmental, perspective view of a computer workstation according to a third embodiment of the present invention with legs of the workstation positioned on a bed and a user in a supine position.

FIG. 4 shows a computer workstation 10 according to a third embodiment, having only two legs 15, 18 supporting the workstation 10 while positioned on the bed 11, with the user 12 in the supine position 13. In this embodiment, legs 15, 18 are somewhat L-shaped to provide support to the stand 14 or the workstation 10.

The monitor 25 on the monitor platform 24 can be made from thin film. The thin film is mounted on the platform 24. The thin film can be also flexible plastic film. Alternatively, the thin film can be an e-ink or polymer light emitting diode (PLED). E-link is a material that is processed into a film for integration into electronic displays. Current devices using E-link® Imaging Film have rigid backplane electronics. However, the imaging film itself is plastic and can be flexed and rolled, combining the complete look and feel of a paper document. PLED is another thin film that uses a polymer sandwiched between a pair of electrodes to generate and emit their own light. PLED permits the creation of an ultra-thin plastic lighting display that operate at low voltage. Accordingly, with many types of alternatives for the monitor 25, the weight on the platform 24 can be reduced substantially.

Figure 5:
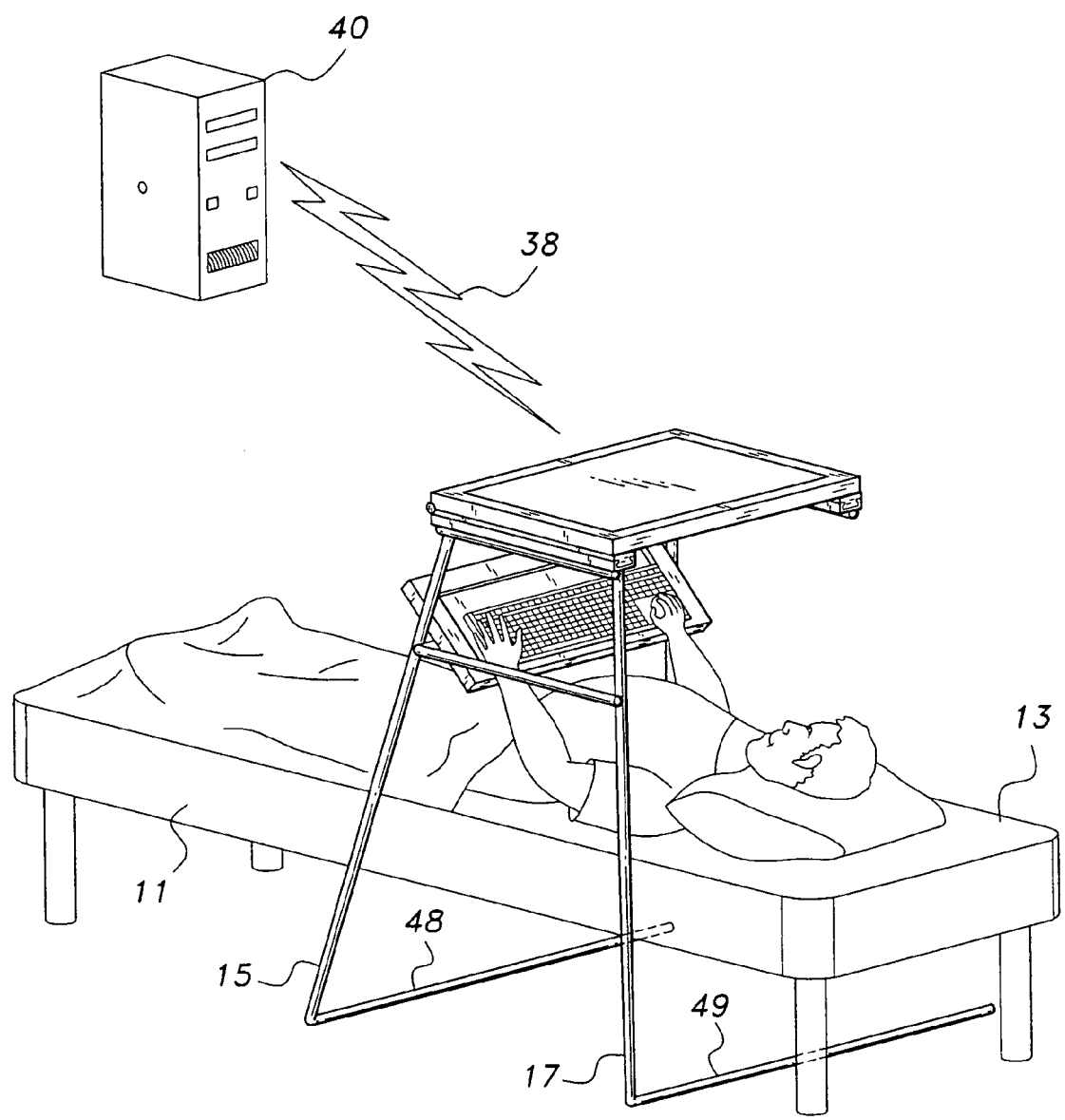
FIG. 5 is an environmental, perspective view of a computer workstation according to a fourth embodiment of the present invention with the legs of the workstation extended to the floor and the user in a supine position.

With reference to FIG. 5, a computer workstation 10 according to a fourth embodiment is shown with the two legs 15, 17 of the stand 14 extended to the floor. Extensions 48, 49 are under the bed 11, while the user 12 is shown in the supine position 13. In this embodiment, the legs 15, 17 are in a semi L-shape, providing support to the workstation 10. The extensions 48, 49 are positioned under the bed 11.

Figure 6:
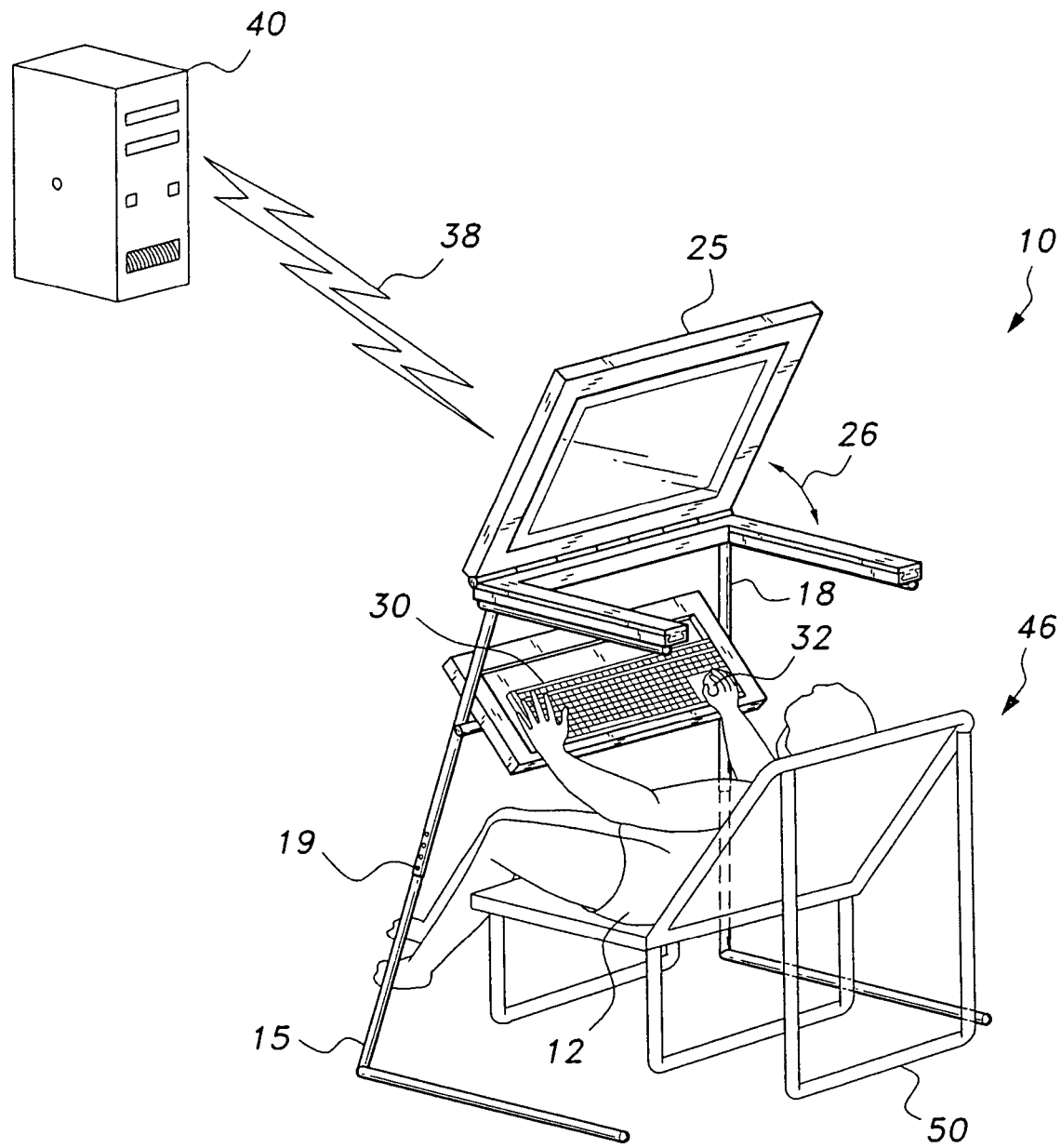
FIG. 6 is an environmental, perspective view of the computer workstation according to the third embodiment of the present invention with the legs extended and the user in a reclining chair and in an inclined position.

In FIG. 6, a computer workstation 10 according to the third embodiment is shown with the legs 15, 18 extended, and the user 12 is shown reclining in a recliner chair 50. The stand 14 has a maximum width of five feet. The monitor 25, trackball 32, and keyboard 30, with optional ports for speakers, microphone, and webcam, permit the user to work with the computer 40 in a reclining position 46. Through the wireless link 38 to the remote computer 40, the user 12 has a virtual computer that can be mounted in any comfortable position without having to buy a laptop or table-mounted computer accessory. Accordingly, compatibility with any full-size computer permits the user 12 to adjust between the fully supine position 13 and a reclining position 46 without external assistance. In fact, the workstation 10 is manually adjustable, sturdy, relatively portable, cost-effective, and safe.

The workstation 10 does not have an integrated chair. The workstation 10 uses wireless connectivity. In fact, the computer 40 of the user 12 is not mounted to the workstation 10, or even part of the stand 14. Also, while the motor M has been shown and described, the stand 14 can be operated manually so that there are no motors needed. In fact, in the manually mode, the only electrical cord is the power cord of the monitor 25, which comes out of the stand 14. Also, regarding component selection, all electronics are selected to meet all necessary product safety certifications and regulatory approvals.

It is to be understood that the present invention is not limited to the embodiments described above, but encompasses any and all embodiments within the scope of the following claims.

I claim:

1. A computer workstation for use by a user in supine and reclining positions, the computer workstation comprising:
    a stand having a plurality of legs, each leg having a spring-loaded locking height adjustment mechanism for locking said leg at a user-selectable height;
    a monitor platform pivotally and slidably attached to the stand, the monitor platform being independently adjustable and lockable in user-selectable horizontal and vertical positions;
    a monitor mounted on the monitor platform;
    a wireless transceiver connected to the monitor, the transceiver being adapted for communicating signals between the monitor and a remote computer; and
    a keyboard/trackball platform pivotally mounted on the stand below the monitor platform, the keyboard/trackball platform being independently adjustable and lockable in a selected vertical position, the keyboard/trackball platform adjustable and lockable around a horizontal axis independent of the monitor platform.

2. The computer workstation according to claim 1, further comprising a wireless keyboard for assisting the user to communicate with the remote computer, the wireless keyboard being detachably mounted on the keyboard/trackball platform.

3. The computer workstation according to claim 1, further comprising a trackball for assisting the user to communicate with the remote computer, the trackball being detachably mounted on the keyboard/trackball platform.

4. The computer workstation according to claim 1, further comprising a pair of crossbar supports connected to the legs of the stand for prevent the stand from bouncing and tipping over.

5. The computer workstation according to claim 1, further comprising:
    a wireless keyboard having a housing; and
    a wireless trackball, the trackball being integrated into the keyboard housing, the keyboard housing being releasably mounted on said keyboard/trackball platform.

6. The computer workstation according to claim 1, further comprising at least one motor for pivoting and sliding the monitor platform in the horizontal and vertical positions, and for pivoting the keyboard/trackball platform around the horizontal axis independent of the monitor platform and into the selected vertical position.

* * * * *